UNITED STATES PATENT OFFICE.

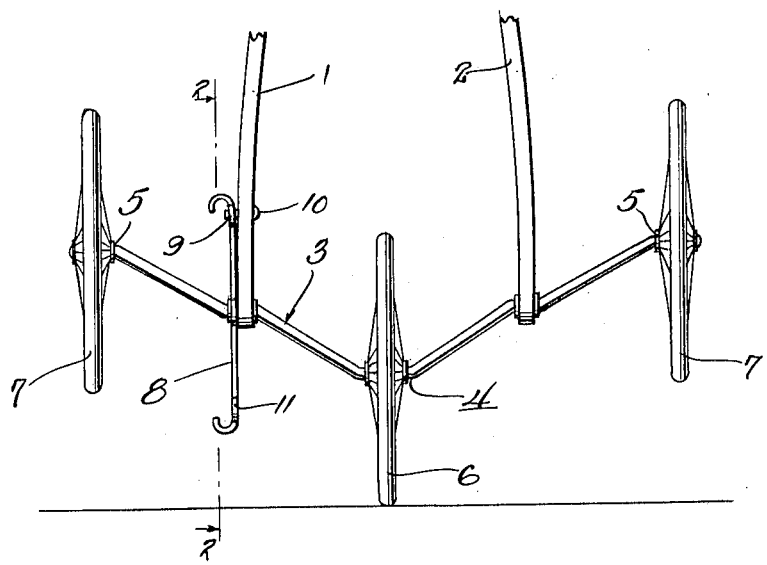
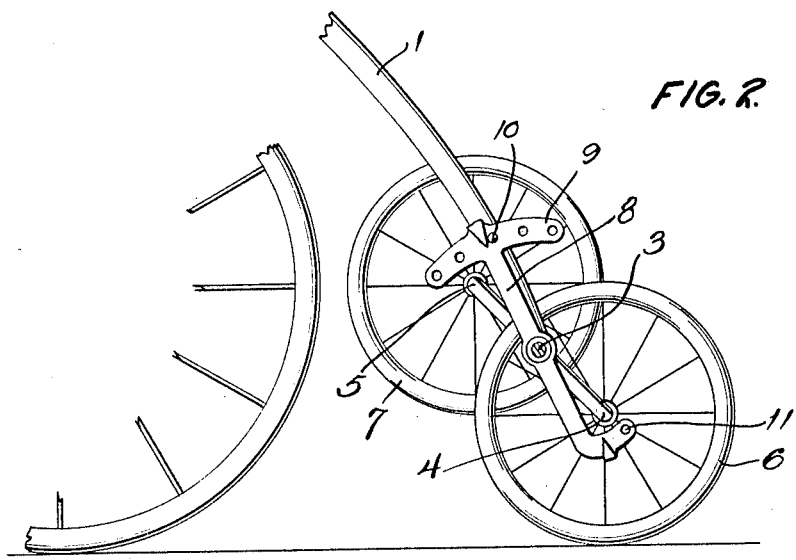

JAMES E. TYLER, OF HELEN, GEORGIA.

CONVERTIBLE VELOCIPEDE.

1,309,493. Specification of Letters Patent. Patented July 8, 1919.

Application filed October 25, 1918. Serial No. 259,658.

*To all whom it may concern:*

Be it known that I, JAMES E. TYLER, a citizen of the United States, residing at Helen, in the county of White and State of Georgia, have invented certain new and useful Improvements in Convertible Velocipedes, of which the following is a specification.

This invention relates to velocipedes and more particularly to one which may be readily converted into a bicycle.

The primary object of the invention is to provide a three wheeled velocipede having the usual two rear wheels mounted upon an axle which also carries an auxiliary wheel adapted to be used when the side wheels of the velocipede are moved to inoperative position whereby the velocipede will be readily converted into a bicycle.

A further object of the invention is to provide a device of this character which consists of comparatively few parts and is simple in construction but durable and well adapted to withstand the rough usage to which devices of this character are ordinarily subjected.

For a full description of the invention and the advantages and merits thereof reference is to be had to the following description and accompanying drawings, wherein is illustrated the preferred form of my invention, in which:—

Figure 1 is a rear elevation of the mechanism employed in carrying out the invention.

Fig. 2 is a side elevation of the same.

Referring to the drawing, wherein is illustrated the preferred form of my invention, in which like numerals of reference indicate like or corresponding parts throughout the several views, the frame bars 1 and 2 are extended rearwardly in the usual manner and are laterally spaced apart as is customary in the construction of velocipedes. The rear axle 3 is journaled in the lower ends of the frame bars 1 and 2 and this axle is in the nature of a crank shaft having the central portion thereof offset as indicated at 4 while the terminals of the axle are offset in the opposite direction as indicated at 5. Therefore, it is possible to swing the axle in its bearings so that the portion 4 will be in the higher plane while the ends 5 will be in a lower plane. The central offset portion 4 of the axle is provided with the auxiliary wheel 6 while the velocipede wheels 7 are mounted on the ends 5 of the axle. It will be obvious from this construction that the axle may be swung or turned in its journals so that either the wheel 6 or the wheels 7 may be placed in engagement with the ground to convert the velocipede into a bicycle or vice versa.

In order that the wheels will be held rigidly in the desired position, I have provided a locking device which comprises an arm 8 rigidly fixed to the axle 3 at a point intermediate the ends of the arm. One end of the arm is provided with a transversely extending portion 9 provided with a plurality of openings, any one of which is adapted to receive a retaining pin 10 carried by the frame bar 1. This portion 9 may be moved so that any one of the openings will be in position to receive the pin 10 and since this arm is rigidly fixed to the axle it will be obvious that the side wheels 7 and 8 may be raised or lowered so that they will be normally disposed at the desired distance above the ground when the wheel 6 is in engagement therewith when the device is in use as a bicycle. When thus employed it will be possible to teach juveniles to ride the bicycle without danger of falling since the wheels 7 will act as a support when the vehicle tilts to either side.

When the device is in use as a velocipede, the opposite end of the arm 8 is engaged with the pin 10, this end of the arm being provided with an opening 11 at its terminal through which the pin 10 is adapted to extend whereby the axle is locked in position for maintaining the wheels 7 in engagement with the ground while the auxiliary wheel 6 is held out of engagement with the ground. Therefore, it is merely necessary to reverse the position of the arm 8 to convert the device into either one of its useful capacities.

The foregoing description and accompanying drawings have reference to what might be considered to be the preferred or approved form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A convertible velocipede of the character described comprising a frame having a rear axle, the said frame including frame bars laterally spaced apart and attached to the axle at points on opposite sides of the center of the axle, the latter being provided with an offset having a wheel mounted thereon to be normally maintained midway between the said frame bars, and wheels mounted on the ends of the axle.

2. A convertible velocipede of the character described comprising a frame having a rear axle, the said frame including frame bars laterally spaced apart and attached to the axle at points on opposite sides of the center of the axle, the latter being provided with an offset having a wheel mounted thereon to be normally maintained midway between the said frame bars, and wheels mounted on the ends of the axle, the said ends of the axle being also offset in a direction opposite to the offset at the center of the axle, whereby the wheels on the end of the axle will be in elevated position when the said center wheel is lowered.

3. A convertible velocipede of the character described comprising a frame having a rear axle, the said frame including frame bars laterally spaced apart and attached to the axle at points on opposite sides of the center of the axle, the latter being provided with an offset having a wheel mounted thereon to be normally maintained midway between the said frame bars, and wheels mounted on the ends of the axle, the said ends of the axle being also offset in a direction opposite to the offset at the center of the axle, whereby the wheels on the end of the axle will be in elevated position when the said center wheel is lowered, and means to maintain the axle in rigid position when the wheels are placed in either of their operative positions.

4. A convertible velocipede comprising a frame, a rear axle journaled in the frame and having a central offset, the ends of the axle being offset in the opposite direction, wheels mounted upon the offset portions of the axle, and a locking device rigidly fixed to the axle and adapted to be releasably engaged with one of the said frame bars to maintain the axle in position to hold either of the said offset portions in operative position.

In testimony whereof I affix my signature in presence of two witnesses.

JAMES E. TYLER.

Witnesses:
E. N. JONES,
F. M. McCLURE.

Copies of this patent may be obtained for five cents each, by addressing the "Commissioner of Patents, Washington, D. C."